INVENTOR.
RALPH W. LAWRENCE
ALBERT J. SECCHI
BY
ATTORNEY

3,141,294
PROPULSION METHOD EMPLOYING
RESONANCE SUPPRESSOR
Ralph W. Lawrence, Glendora, and Albert J. Secchi, Arcadia, Calif., assignors to Aerojet-General Corporation, Azusa, Calif., a corporation of Ohio
Filed May 31, 1960, Ser. No. 33,055
30 Claims. (Cl. 60—35.4)

This invention relates to novel solid propellant compositions and in particular to novel propellant compositions having superior burning characteristics comprising a resin binder, a relatively small quantity of aluminum, silicon, or graphite, and a finely divided oxidizing agent.

Solid propellant compositions are ordinarily composed of a resin fuel and an oxidizing material, the oxidizing material being intimately dispersed in the fuel. The ignition and burning properties of a propellant composition as well as its physical properties are dependent to a large extent upon the particular resins employed as fuels. In the novel propellant compositions of this invention, the preferred fuel is a cross-linked polyurethane which yields propellants of unexpectedly superior physical properties and performance characteristics.

The principal object of our invention is to provide a solid propellant material which is not subject to unstable burning and which possesses superior physical properties.

We have discovered that the presence of a very small quantity of aluminum, silicon, or graphite in a solid propellant grain yields a substantial and unexpected improvement in its burning characteristics. This is the essence of our invention and hence the invention is not limited to propellants containing the preferred polyurethane binders but is broad enough to encompass the field of solid propellant binders in general. Thus, propellants containing well-known binders such as, for example, nitropolyurethane, polyester-acrylate, rubber (butyl, polysulfide), etc., are all within the scope of our invention.

We have found that the presence of a small quantity of aluminum, silicon, or graphite in a solid propellant grain suppresses resonant burning of the propellant when in use. Resonant burning, or as it is sometimes called, unstable burning, is a phenomenon encountered in the firing of rocket motors whereby high frequency pressure oscillations disturb the normal burning process and in severe cases even rupture the combustion chamber. Methods heretofore employed for controlling resonant burning have involved the use of mechanical dampers such as resonance rods or baffles or the incorporation of an additive such as potassium perchlorate into the propellant grain. However, there are disadvantages in the use of these methods. For example, the mechanical dampers add dead weight to the unit and the use of an additive such as potassium perchlorate normally increases the temperature coefficient of chamber pressure at constant area ratio. In addition, potassium perchlorate results in the production of smoke which is undesirable in many instances.

In contrast to the above-described methods of suppressing resonant propellant burning, the use of small quantities of aluminum, silicon, or graphite for this purpose adds little dead weight and, furthermore, does not significantly increase the temperature coefficient of chamber pressure. Also, the propellants of this invention burn with less smoke than grains incorporating potassium perchlorate as a resonance suppressor. It is, of course, within the scope of our invention to employ any combination or mixture of aluminum, silicon, and graphite or of any two of these additives as resonance suppressors in our novel propellants.

The novel polyurethane-aluminum propellants of our invention can be cured at low temperatures and in addition exhibit no measurable heat of reaction. As a result of these unique properties they are not subject to shrinkage and hence have substantially no internal strains. Composite propellant systems other than polyurethane propellant systems have all been severely restricted in their use because of high heats of reaction and the need for high cure temperatures which produce shrinkage and internal stresses. These faults have heretofore imposed severe restrictions upon the size of solid propellant motors because of their tendency to crack as a result of such internal stresses. The preferred propellants of this invention are not subject to such size limitations because of the use of cross-linked polyurethanes as the resin fuel component thereof.

In addition to their freedom from cracking and high-specific impulse, our preferred propellants are possessed of sufficiently tenacious adhesive properties to enable them to be bonded directly to rocket chamber linings, thus permitting optimum utilization of the available space in the rocket motor and simplifying manufacturing techniques. Our polyurethane propellants are also possessed of many other desirable properties among which are rubbery mechanical qualities, low brittle point, excellent resilience, and superior aging properties.

Our novel solid propellants can be used as the primary propulsion source in rocket-propelled vehicles or as a propellant for artillery missiles. When used as the primary propulsion source for rocket vehicles, they can be conveniently ignited by a conventional igniter as, for example, the igniter disclosed in assignee's copending U.S. patent application Serial No. 306,030, filed August 23, 1952. The propellant is preferably cast directly in the rocket chamber in which it is to be fired and restricted on one or both ends in the conventional manner with a relatively slow burning inert resin such as a polyurthane or a polyester resin. The restriction is preferably accomplished by applying a relatively thin coating of the inert resin to the inner surfaces of the rocket chamber lining prior to casting the propellant therein. Rocket chambers such as those in which our novel solid propellants are employed are ordinarily of the conventional type having one end open and leading into a venturi rocket nozzle. Upon ignition, large quantities of gases are produced and exhausted through the nozzle creating propulsive force.

The preferred polyurethane binders of our invention are prepared by reacting a compound having two or more active hydrogen groups capable of polymerizing with an isocyanate with an organic compound having as the sole reacting groups two or more isocyanate or isothiocyanate groups. The compound having the active hydrogen groups is perferably an organic compound having as its sole reacting groups hydroxyl or thiol groups.

It will be apparent that, where there are more than two active hydrogen, isocyanate, or isothiocyanate groups present on any of the polyurethane reactants, the resulting molecular structure of the polyurethane binder will be at least to a certain extent of a cross-linked rather than a linear nature. The cross-linking is accomplished when all three functional groups of a sufficient number of the trifunctional molecules undergo the urethane reaction with other groups present in the mixture, thus resulting in a product having a "three-dimensional" molecular structure rather than mere aggregates of linear chains as is the case when bifunctional reactants are employed.

Where bifunctional reactants such as dihydroxy compounds and diisocyanates are employed to produce the polyurethane binders for our novel propellants, it is necessary to also employ a "cross-linking" agent to assure a product having the crosslinked structure essential to this invention. Cross-linking agents can also be used with polyurethane reactants having more than two functional groups such as triols and/or triisocyanates within the scope of this invention. Compounds suitable as cross- It will be appreciated that in any given batch of prolinking agents for our polyurethane binders are those organic compounds having as the sole reacting groups three or more groups polymerizable with hydroxy or isocyanate groups.

pellant the individual polyurethane molecules may vary in number of repeating units from several to tens of thousands of these units, hence molecular weight figures on polyurethanes represent statistical averages. The exact nature of terminal groupings is not known and will vary depending upon whether plasticizers, polymerization catalysts, etc., are present. Moreover, a given molecule may even form a ring and thus leave no dangling radicals.

It is evident from the above that a wide variety of polyurethane binders for the propellants of this invention can be prepared by varying the particular isocyanate and hydroxy starting materials.

The isocyanate starting materials for our polyurethane binders are preferably diisocyanates but not necessarily so since, as explained above, other polyisocyanates (such as triisocyanates) or polyisothiocyanates may be employed within the scope of the invention if desired.

Our preferred diisocyanate compounds can be saturated or unsaturated; aliphatic or aromatic; open or closed chain; and, if the latter, monocyclic or polycyclic; and substituted or not by groups substantially unreactive with isocyanate or hydroxyl groups such as, for example, ketone, halogen, ester, sulfide, or ether groups. The following diisocyanate compounds are particularly suitable as reactants for the preparation of binders for our novel polyurethane propellants:

(a) Alkane dissocyanates such as
Ethylene diisocyanate;
Trimethylene diisocyanate;
Propylene-1,2-diisocyanate;
Tetramethylene diisocyanate;
Butylene-1,3-diisocyanate;
Decamethylene diisocyanate;
Octadecamethylene diisocyanate; etc.

(b) Alkene diisocyanates such as
1-propylene-1,2-diisocyanate;
2-propylene-1,2-diisocyanate;
1-butylene-1,2-diisocyanate;
3-butylene-1,2-diisocyanate;
1-butylene-1,3-diisocyanate;
1-butylene-2,3-diisocyanate; etc.

(c) Alkyidene diisocyanates such as
Ethylidene diisocyanate;
Propylidene-1,1-diisocyanate;
Propylidene-2,2-diisocyanate; etc.

(d) Cycloalkyene diisocyanates such as
Cyclopentylene-1,3-diisocyanate;
Cyclohexylene-1,3-diisocyanate;
Cyclohexylene-1,2-diisocyanate;
Cyclohexylene-1,4-diisocyanate; etc.

(e) Cycloalkylidene diisocyanates such as
Cyclopentylidene diisocyanate;
Cyclohexylidene diisocyanate; etc.

(f) Aromatic diisocyanates such as
m-Phenylene diisocyanate;
o-Phenylene diisocyanate;
p-Phenylene diisocyanate
1-methyl-2,4-phenylene diisocyanate;
Naphthylene-1,4-diisocyanate;
Diphenylene-4,4'-diisocyanate;
2,4-tolylene diisocyanate;
2,6-tolylene diisocyanate;
4,4'-diphenylmethane diisocyanate;
1,5-naphthalene diisocyanate;
Methylene-bis-(4-phenylisocyanate);
2,2-propylene-bis-(4-phenylisocyanate);
2,3-pyridine diisocyanate;
Xylylene-1,4-diisocyanate;
Xylylene-1,3-diisocyanate;
4,4'-diphenylenemethane diisocyanate;
4,4'-diphenylenepropane diisocyanate; etc.

(g) Alkane ether diisocyanates such as
OCN—$CH_2CH_2$—O—$CH_2CH_2$—NCO; etc.

The preferred hydroxy starting materials for our polyurethane binders are dihydroxy compounds having the general formula HO—R—OH; where R is a divalent organic radical. The hydroxy groups on the above compounds can be of any type suitable for the urethane reaction with isocyanate groups such as, for example, alcohol or phenolic hydroxy groups. The following dihydroxy compounds are particularly suitable as reactants for the polyurethane binders of this invention:

(1) Alkane diols having a chain length of from 2 to 20 carbon atoms, inclusive, such as 2,2-dimethyl-1,3-propanediol;
Ethylene glycol;
Tetramethylene glycol;
Hexamethylene glycol;
Octamethylene glycol;
Decamethylene glycol; etc.

(2) Alkene diols such as 1-propylene-1,2-diol;
2-propylene-1,2-diol;
1-butylene-1,2-diol;
3-butylene-1,2-diol;
1-hexylene-1,3-diol;
1-butylene-2,5-diol; etc.

(3) Cycloalkylenediols such as

Cyclopentylene-1,3-diol;
Cyclohexylene-1,2-diol;
Cyclohexylene-1,3-diol;
Cyclohexylene-1,4-diol; etc.

(4) Aromatic diols such as

Catechol;
Resorcinol;
Quinoil;
1-methyl-2,4-benzenediol;
2-methyl-1,3-naphthalenediol;
2,4-toluenediol;
Xylylene-1,4-diol;
Xylylene-1,3-diol;
1,5-naphthalenedimethanol;
2-ethyl-1-phenyl-3-butene-1,2-diol;
2,2-di(4-hydroxyphenyl)propane;
6-methyl-2,4-pyrimidinediol; etc.

(5) Alkane ether diols and diamido alkane diols such as

Di($\beta$-hydroxyethl) ether;
6-methyl-2,4-pyrimidinediol;

$$HOCH_2\underset{\underset{O}{\|}}{C}NH(CH_2)_6NH\underset{\underset{O}{\|}}{C}CH_2OH;\ etc.$$

Other dihydroxy compounds suitable for the polyurethane reaction of this invention are polyesters such as those obtained from the reaction of a dihydric alcohol such as ethylene glycol, diethylene glycol, propylene glycol, butylene gycol, or hexamethylene glycol with a dicarboxylic acid such as succinic acid, adipic acid, sebacic acid, oxadibutyric acid, sulfodipropionic acid, and related compounds. The polyesters most suitable for purposes of this invention are those having a molecular weight from about 1000 to about 2500. In preparing polyesters such these, the dihydric component is permitted to react with the dicarboxylic acid component to produce the polyester. Mixtures of polyesters and an olefin such as styrene, vinyl acetate, or the like, are particularly suitable for purposes of this invention. The olefin does not react with any of the hydroxy groups present in the mixture, nor does it interfere in any way with the subsequent reaction between these hydroxyl groups and the isocyanate groups in the polyurethane reaction mixture. Neither does it interfere with any reactions of cross-linking agents present in the mixture. The principal function of the olefin is the permit linkage of the polyester molecules together through additional polymerization.

The above-mentioned polyesters can be prepared from either saturated or unsaturated dihydric alcohols and saturated or unsaturated dicarboxylic acids. The anhydrides of any of the dicarboxylic acids can be substituted for all or part of any of them in the preparation of polyesters suitable for the polyurethane reaction of our invention. The usual and preferred manner of making suitable polyesters is to react a mixture of an unsaturated dicarboxylic acid (such as adipic acid, sebacic acid, or the like) or anhydride and a saturated or aromatic dicarboxylic acid or anhydride with a dihydric alcohol. Examples of unsaturated dicarboxylic acids which can be employed are maleic acid, fumaric acid, citraconic acid, mesaconic acid, itaconic acid, etc.

In addition to the polyyesters, polyethers such as polyethylene ether glycols, polyproplene ether glycols, other polyalkylene ether glycols, and mixtures or copolymers thereof having molecular weights of from about 400 to about 10,000 can be utilized as dihydroxy reactants of the polyurethane reaction of this invention.

Polysulfides having two or more thiol groups, such as ethylene disulfide and polysulfides with glycol end groups such as those having the general formula HO(CH$_2$—CH$_2$—S—S)$_x$—CH$_2$CH$_2$OH where $x$ is a whole number, are other suitable reactants for the polyurethane reaction of our invention.

It will be appreciated by those skilled in the art that mixtures of suitable polyhydroxy and/or polyisocyanate compounds can be used for purposes of this invention if desired.

It is well-known to those skilled in the art that polyisothiocyanates and polythiol compounds react to yield urethane-type products as do the polyisocyanates and polyol compounds. Consequently, the polyisothiocyanates and polythiols corresponding to any of the polyisocyanates or polyhydroxy compounds taught herein can be employed for the preparation of propellant binders useful in this invention. For example, diisothiocyanates such as butylene-1,3-diisothiocyanate; ethylidene diisothiocyanate; cyclohexylene-1,2-diisothiocyanate; cyclohexylidene diisothiocyanate; p-phenylene diisothiocyanate; xylylene-1,4-diisothiocyanate; etc.; react with dithiol compounds such as decamethylene dithiol; thioresorcinol; ethylene bis-(thioglycolate); etc.; to yield polythiourethane compounds which are suitable as binders of our novel propellant compositions. Any mixture of the diisocyanates and/or diisothiocyanates suitable as reactants for the propellant binders of this invention can be reacted with any mixture of diols and/or dithiols disclosed as suitable for the purpose within the scope of our invention.

It will be appreciated by those skilled in the art that a great variety and number of polyfunctional organic compounds will serve as cross-linking agents for the polyurethane binders of this invention. As indicated above, any organic compound having as its sole reacting groups three or more groups polymerizable with hydroxy or isocyanate groups is a suitable cross-linking agent for purposes of this invention. This includes not only the obvious polyfunctional hydroxy, thiol, isocyanate, and isothiocyanate compounds but aslo compounds containing other groups polymerizable with either hydroxy or isocyanate groups. For example, compounds with three or more groups containing reactive hydrogen which are capable of polymerization with isocyanates can be employed as cross-linking agents within the scope of this invention. Examples of compounds of this class are proteins and synthetic polyamides such as polyhexamethylene adipamides. The cross-linking agents of this invention can be saturated or unsaturated, aliphatic or aromatic; open or closed chain and, if the latter, monocyclic or polycyclic; and substituted or not by groups substantially unreactive with isocyanate or hydroxyl groups such as, for example, ketone, halogen, ester, sulfide, or ether groups.

Examples of compounds which we have found to be particularly suitable as cross-linking are glycerol monoricinoleate; glycerol triricinoleate (referred to hereinafter as GTRO); 1,2,6-hexanetriol; methylene bis-(orthochloroaniline); monohydroxyethyl trihydroxypropyl ethylenediamine; polyaryl polyisocyanate; pentaerythritolpropylene oxide adduct; N,N,N',N'-tetrakis (2-hydroxypropyl) ethylenediamine; triethanolamine; trimethylolpropane; and triisocyanates such as toluene-2,4,6-triisocyanate.

Other substances suitable as cross-linking agents are glycerol, sorbitol, dextrin, starch, cellulose, ethyl cellulose, cellulose acetate, polyvinyl acetals, polyvinyl ketals, polyvinyl alcohol, diethylenetriamine, polyvinyl mercaptans, and shellac.

As in the case of the polyurethane reactants, mixtures of the various cross-linking agents can be employed within the scope of this invention.

While polyurethane binders are preferred for purposes of this invention, it is within the scope of the invention to employ any other solid propellant binder in our novel propellants. For example, resinous binders such as asphalt, rubbers, polysulfides, rubber-polysulfide mixtures, resins, other combustible polymeric organic materials, etc., are all suitable for this purpose. Examples of combustible polymeric organic materials suitable as propellant binders are phenol-aldehyde resins, polyester resins, acrylate resins, and polyalkylene resins.

Examples of rubber binders which can be employed within the scope of our invention are polyisobutylene, butyl rubber, butadiene-styrene copolymers such as Buna-S, a butadiene-acrylonitrile copolymer such as Buna-N, highly polymerized vinyl alcohols in a plasticized state such as polyvinyl alcohol and chloroprene polymers such as neoprene. The polysulfides suitable as solid propellant binders are exemplified by polyalkylene sulfides such as that resulting from the condensation of ethylene dichloride and sodium tetrasulfide. A more complete description of rubber and polysulfide propellant binders can be found in assignee's copending U.S. patent application Serial No. 637,004, filed December 22, 1945.

The so-called polyester resins suitable for use as solid propellant binders are formed by reacting a polyhydric alcohol with a polycarboxylic acid and copolymerizing therewith a monomeric olefinic component such as a vinyl, allyl, or other olefin compatible with the resin. To permit heteropolymerization between the polyester and olefin components, the polyesters are provided with some unsaturation through the incorporation therein of unsaturated polycarboxylic acid or anhydride and/or unsaturated polyhydric alcohol.

Saturated polycarboxylic acids useful in compounding the polyester resins are, for example, the aliphatic dibasic acids, including oxalic, malonic, succinic, glutaric, adipic, pimelic, sebacic, azelaic acids, etc., and the unsaturated carboxylic acids useful as the acidic components in forming polyester resins are maleic acid, fumaric acid, citraconic acid, mesaconic acid, itaconic acid, etc. The anhydrides such as itaconic anhydride and phthalic anhydride may likewise be used for supplying the desired unsaturation.

Regardless of which of the saturated acids are used, the degree of unsaturation necessary to provide cross-linkage with the vinyl, allyl, or other olefinic components may be obtained by the addition of any of the above-named unsaturated acids or their anhydrides.

The alcohols that can be used are not limited to the dihydric alcohols as other polyhydric alcohols such as the trihydric and higher polyhydric alcohols may be used. These afford additional possibilities for cross-linking and as a consequence the toughness and brittleness of the final resin may be controlled as desired.

For the polyhydric alcohol component any of the following alcohols may be used: dihydric alcohols such as ethylene glycol, diethylene glycol, triethylene glycol, propylene glycol, etc.; a trihydric alcohol such as glycerol; tetrahydric alcohols such as the erythritols, pentaerythritols, etc.; pentitols which include arabitol, adonitol, xylitol, etc.; hexitols including mannitol, sorbitol, dulcitol, etc.; heptitols such as persitol, volamitol, etc.; or mixtures of any of the above alcohols may be also employed if desired.

The olefinic component of the polyester resin binders may be styrene; vinyl acetate; acrylic acid esters; methacrylic acid esters; allyl componds such as allyl diglycol carbonate, diallyl maleate, and diallyl glycolate; and other unsaturated components such as propylene, butadiene, etc.; as well as derivatives of any of the above substances which are capable of polymerization with the resin. In general, any olefin which will polymerize with the resin to form a solid grain may be employed; this includes all unsubstituted olefins and in addition many substituted olefins.

The polyester resins suitable as propellant binders and their methods of preparation are more fully disclosed in assignee's U.S. patent application Serial No. 109,409, filed August 9, 1949.

Acrylate resin binders within the scope of this invention comprise copolymers of any two or more reduced oxygen-containing polymerizable monomers such as alkenoic acids, alkenoic acid esters, dialkenyl diglycolates, dialkylene diglycol bis-(alkenyl carbonate), alkenyl phthalates, etc. Examples of reduced oxygen-containing polymerizable monomers suitable for acrylate propellant binder formation are the acrylates and methacrylates such as methyl methacrylate, methyl acrylate, ethyl acrylate, propyl acrylate, butyl acrylate, butyl methacrylate, propyl methacrylate, diethylene glycol bis-(allyl carbonate), glycidol allyl ether, diallyl phthalate, diallyl diglycolate, diallyl maleate, diallyl fumarate, etc.

Other acrylate binders suitable for use in our invention are prepared by copolymerizing polymerizable substances containing unreduced oxygen in the molecule, such as the nitro and nitroether-substituted alkenoic acids and esters. Specific examples of nitro-containing monomers which copolymerize to form acrylate propellant binders are 2-nitroethyl acrylate; the nitrobutyl acrylates; 2,2-dinitropropyl acrylate; 2,2,3,3-tetranitrobutyl acrylate; and 2,2,3,3-tetranitrobutyl methacrylate.

Still other acrylate binders comprise copolymers of any one or more of the above-mentioned reduced oxygen-containing monomers and any one or more of the above-mentioned monomers containing unreduced oxygen in the molecule. These binders, as well as those acrylate binders referred to above, and their methods of preparation are more fully described in assignee's copending U.S. patent application Serial No. 321,941, filed November 21, 1952.

Polyurethane resins containing unreduced oxygen are suitable binders for the propellants of our invention. Such binders can be prepared by condensing nitro-containing isocyanates and nitro-containing alcohols, as more fully disclosed in assignee's copending U.S. patent application Serial No. 728,491, filed April 14, 1958.

In the preparation of the nitro-substituted polyurethanes of application Serial No. 728,491, both the alcohol and isocyanate starting materials may contain nitro groups. However, this is not necessary and it is sufficient if the nitro groups are initially present on only an alcohol or isocyanate starting material. The nitro-substituted polyurethanes (hereinafter referred to as nitropolyurethanes) can be cross-linked or not as desired.

Polyurethane propellants can be prepared with any degree of nitro saturation and all are suitable as propellant binders. It is not necessary to employ an oxidizing salt in nitropolyurethane propellant grains having sufficient oxygen present in the nitro groups to permit satisfactory burning of the propellant after combustion has been initiated.

Examples of alcohols useful for the preparation of nitropolyurethane propellant binders are lower alkylene diols such as ethylene glycol, 1,3-propanediol, and 1,2-pentanediol; nitroalkylene diols such as 2-methyl-2-nitro-1,3-propanediol, 4,4,6,8,8-pentanitro-1,11-undecanediol, 2,2,4,4-tetranitro-1,5-pentanediol, 4,4,6,6,8,8-hexanitro-1,11-undecanediol, 5,5,5-trinitro-1,2-pentanediol, 5,5-dinitro-1,2-hexanediol, and 2,2-dinitro-1,3-propanediol; nitrazaalkylene diols such as 3-nitraza-1,5-pentanediol, 3,6-dinitraza-1,8-octanediol, and 2-nitraza-1,4-butanediol; and nitrazanitroalkylene diols such as 5-aza-3,3,5,7,7-pentanitro-1,9-nonanediol and 6-aza-3,6-dinitro-1,8-octanediol.

Examples of isocyanates useful as starting materials for the preparation of nitropolyurethane propellant binders are lower alkylene diisocyanates such as methylene diisocyanate, ethylene diisocyanate, and 1,3-propane diisocyanate; nitroalkylene diisocyanates such as 3,3-dinitro-1,5-pentane diisocyante, 3,3,5,7,7-pentanitro-1,9-nonane diisocyante, 2,2,4,4-tetranitro-1,5-pentane diisocyanate, and 5,5,5-trinitro-1,2-pentane diisocyanate; nitrazaalkylene diisocyanates such as 3,6-dinitraza-1,8-octane diisocyanate, 3-nitraza-1,5-pentane diisocyanate, and 2-nitraza-1,4-pentane diisocyanate; and nitrazanitroalkylene diisocyanates such as 5-aza-3,3,5,7,7-pentanitro-1,9-nonane diisocyanate, 6-aza-3,6-dinitro-1,8-octane diisocyanate, and 5-aza-3,3,5-trinitro-1,9-nonane diisocyanate.

Mixtures of any of the above-named alcohols and isocyanates can be polymerized to form propellant binders within the scope of this invention.

Illustrative of other solid propellant binders suitable for use in the novel propellants of our invention are those disclosed in U.S. Patent 2,479,828 and British Patent 579,057.

Still other types of binders suitable for use in our novel solid propellant compositions are nitrocellulose-plasticizer binders of the type prepared by curing mixtures of finely divided nitrocellulose and suitable plasticizers such as pentaerythritol trinitrate. Binders of this type and their methods of preparation are well-known to those skilled in the propellant art.

A finely divided nitrocellulose suitable for use in the preparation of the subject binders is obtained by first dissolving nitrocellulose, preferably prepared from cotton linters, in a solvent such as an ethyl acetate-acetone mixture, an ethyl acetate-ethanol mixture, or nitromethane to form a lacquer. The lacquer is slurried in an aqueous medium containing a suspending agent such as methyl cellulose in combination with an emulsifier such as Turkey red oil and an agent to prevent agglomeration such as, for example, sodium chloride as a result of which the nitrocellulose precipitates from the solvent and is recovered as a particulate material having an average particle size of 10–12 microns and an over-all particle size range of from about 1 to about 35 microns. Finely divided nitrocellulose such as that prepared by the above-described method is known to those skilled in the art as plastisol grade nitrocellulose and will be hereinafter referred to as such. Plastisol grade nitrocellulose is readily available on the open market.

A variety of plasticizers are suitable for use in the preparation of the subject binders, the preferred one being pentaerythritol trinitrate. It is not necessary, however, that the plasticizer be a high energy compound such as a nitrate ester and so-called inert plasticizers such as dibutyl phthalate as well as mixtures of high energy and inert plasticizers can be employed in the preparation of solid propellant binders based on nitrocellulose of the type under present consideration. Examples of other plasticizers known by those skilled in the art to be useful for the instant purpose are nitroglycerin, diethylene glycol dinitrate, diethyl phthalate, trimethylolethane trinitrate, triethylene glycol dinitrate, dinitropropyl nitrazapentanoate, dinitropropyl sulfide, trimethylol hydroxymethane trinitrate, trimethylol propane trinitrate, trimethylol nitromethane trinitrate, and ethylene glycol dinitrate. The use of any mixture of suitable plasticizers in the preparation of nitrocellulose based binders for our novel propellants is, of course, within the scope of our invention.

It is not felt necessary to describe the nitrocellulose based binders in any greater detail than that given above since, as already indicated, such binder systems are known to the trade and, hence, their preparation for purposes of this invention would pose no problems to those skilled in the art.

Where aluminum is used as the resonance suppressor of the novel propellants of this invention it is preferably employed in finely divided form. The particle size of the aluminum is not critical but we have observed that its combustion efficiency for purposes of this invention tends to decrease to a certain extent as the particle size increases above about $25\mu$. Below $25\mu$, no such effect has been observed and consequently the preferred particle sizes for our novel propellants are those of about $25\mu$ and below.

The aluminum powders presently available are generally comprised of either spherical particles or plate-shaped ones. We have found the former to be more desirable since they are possessed of higher purity and contribute to more favorable rheological properties in the propellant mix. The plate- or flake-shaped particles interlock to a certain extent in the semifluid propellant mixes, as a result of which there is a tendency toward poor distribution of the aluminum particles therein and this has an adverse effect on the rheological properties of the system.

Examples of aluminum powders having spherical-shaped particles suitable for purposes of this invention are those commercially available under the trade names Alcoa 101, Alcoa 120, Alcoa 123, Reynolds 1–511, and Reynolds 400. An example of a commercially available aluminum powder having flake-shaped particles is Alcoa 606.

The spherical-shaped aluminum particles are normally manufactured by atomizing (nozzle-spraying of molten aluminum) means and the flake-shaped particles by ball-milling. The particle sizes of the above aluminum powders are tabulated below:

| Product | Particle Size |
| --- | --- |
| SPHERICAL-SHAPED | |
| Alcoa 101 | 44–210$\mu$, 20%. <44$\mu$, 80%. |
| Alcoa 120 | [1] 70$\mu$. |
| Alcoa 123 | [1] 25$\mu$. |
| Reynolds 1–511 | [1] 25$\mu$. |
| Reynolds 400 | [1] 8$\mu$. |
| FLAKE-SHAPED (Flake Thickness is Usually 2.0$\mu$ or Less) | |
| Alcoa 606 | 2>10$\mu$, 0.2%. 44–210$\mu$, 9.8%. <44$\mu$, 90.0%. |

[1] Average particle size as determined by the micromerograph method. This method is based on Stoke's Law of the rate of sedimentation of a spherical particle in a fluid medium $$v=\frac{2r^2g(d-d_m)}{9n}$$

where
$v$ = equilibrium velocity at which the friction force equals the force of gravitation
$r$ = radius of particles
$g$ = gravitational acceleration
$d$ = density of particle
$d_m$ = density of fluid medium
$n$ = viscosity of the medium Therefore, the determination of the equilibrium velocities of particles in a heterogeneous mixture gives the particle size, and the rate at which fractions travel through a fixed distance gives the distribution from which the average particle size is calculated.

As in the case of the aluminum, the silicon and graphite additives of this invention are preferably employed in finely divided form although particle size is not critical to their proper functioning as resonance suppressors. A commercial silicon product which serves as an excellent resonance suppressor for purposes of this invention is Silicon Grade I, Class C. Silicon Grade I, Class C, comprises 97 percent silicon and traces of iron and aluminum and its particle size distribution is 170 mesh>98 percent
230 mesh>90 percent Graphite No. 635 is an example of a finely divided graphite commercially available for use in our invention. Graphite No. 635 is comprised of 97 percent graphite and traces of $Al_2O_3$ and $SiO_2$. It has particles of irregular shape and within the following size distribution:

| | Percent |
| --- | --- |
| 100–200 mesh | 20–35 |
| 200 mesh | 65–80 |

The propellants of this invention contain, as oxidizers, nonmetallic oxidizing salts such as the chromates, dichromates, permanganates, nitrates, chlorates, and perchlorates of ammonia, hydrazine, guanidine, etc. The selection of the oxidizing salt depends upon the specific burning properties desired in the propellant grain. Mixtures of suitable nonmetallic oxidizing salts can be used within the scope of this invention.

Various additives may be employed in preparing the preferred polyurethane binders of this invention. For example, plasticizers familiar to those skilled in the art such as isodecyl pelargonate; 4-nitrazapentanonitrile; 2,2-dinitropropyl-4-nitrazapentanoate; dioctyl azelate; etc.; as well as those commercially available as such; may be utilized. Also, catalysts for the polyurethane reaction such as triethylamine and other tertiary amines; ferric acetylacetonate and other metal acetylacetonates such as vanadyl acetylacetonate, etc.; stannic chloride, etc.; can be employed if desired. The catalysts can be employed in quantities within the range from mere traces up to amounts equivalent to about one percent by weight of the total mass, and even higher. Normally, amounts of from about 0.02 to about 0.10 percent by weight, on a total weight basis, are employed.

The polyurethane polymerization reaction may be carried out either in a suitable solvent or in the absence of a solvent. The solvent may be present in such great excess as to form a solution of the monomers or it may be used in relatively small quantities. Suitable solvents are those in which the various ingredients of the reactant mixture are soluble such as 4-nitrazapentanoate, dioxan, dimethylphthalate, etc.

Burning rate modifiers and other additives such as antioxidants, wetting agents, antifoaming agents, etc., can be employed, if desired, in the formulation of our novel propellants. In this connection, we have discovered that copper chromite and finely divided carbon black, which is to be distinguished from graphite when utilized in small quantities (comprising preferably not greater than about 2 percent, and for best results not greater than about 1 percent, of the total propellant weight) are useful for increasing the burning rate of the propellant. We have also found certain well-known wetting agents, such as lecithin, to be useful processing aids in the preparation of our novel propellants. A wetting agent which we have found to be particularly suitable for our purpose is that known commercially as G–2684. G–2684 is a mixture of sorbitan monooleate and polyoxyethylene esters of mixed fatty and resin acids. For best results, we have determined that wetting agents should be employed in proportions comprising not more than about 1 percent by weight of the total propellant composition and preferably in proportions much lower than this. Various additives other than those specifically mentioned can be employed, in minor amounts, within the scope of our invention. For example, phenyl betanaphthylamine can be utilized in very small quantities as an antioxidant.

In preparing the preferred propellants of this invention, the polyurethane polymerization can be conducted at any temperature, the only effect of temperature variation being a corresponding increase or decrease in the rate of reaction. The polymerization readily takes place at room temperature but higher temperatures increase the rate of reaction and are therefore desirable in many cases. As explained above, however, temperatures lower than as well as higher than room temperature can be used for our polymerization reaction.

Because higher temperatures tend to produce shrinkage and internal strains, it is preferable to carry out the cure at temperatures in the range of from about 70° to about 180° F. Within this range the reaction rate is sufficiently rapid for economical production and yet the temperature is not so high as to produce shrinkage and internal stresses which must be avoided at all costs, especially in the case of large solid propellant motors.

Those skilled in the art will appreciate the fact that heating and cooling steps can be incorporated into our propellant processing procedure for various reasons, such as for the attainment of optimum operating conditions, if desired. Likewise, various other techniques which serve to optimize the processing procedure or improve the quality of the product (such as vacuumizing the mixture during certain phases of the operation) can be employed in the practice of this invention if desired.

The various processing steps of this invention can be carried out with standard equipment well-known to those skilled in the art as suitable for the purpose.

There are many ways of processing the various ingredients within the scope of this invention in the formulation of polyurethane propellants therefrom. In general, however, we have found it preferable to add the resonance suppressor to one or more of the liquid binder components of the system prior to incorporating the oxidizer and other ingredients therein, the principal reason for this being one of safety. Powdered aluminum is known to be explosive in the presence of oxygen and a hazard is created where aluminum is permitted to contact a dry oxidizing material. Our preferred method of aluminum addition precludes its contact with the dry oxidizer and hence there is substantially no danger of explosion when this procedure is followed.

Where the polyurethane reactants are diols and diisocyanates and the cross-linkers are polyhydroxy compounds, the diol can be first mixed with the cross-linker and the aluminum, silicon, or graphite added to the liquid mixture, after which the inorganic oxidizer and the diisocyanate can be stirred or otherwise mixed into the mass. Catalysts and/or other additives can be introduced into the mixture prior to or at the same time as the addition of the diisocyanate or subsequent to this addition. The various additives do not all have to be added at the same stage of processing and, in fact, it has been found preferable in most cases to deviate from this procedure.

One technique which we have found to be quite satisfactory (where the major ingredients and order of addition of these ingredients are as described above) comprises addition of the wetting agent or agents, along with the plasticizer, to the diol, aluminum, or equivalent and cross-linker in the mixer; addition of the burning rate modifiers (such as copper chromite and carbon black) during addition of the inorganic oxidizer; and addition of the curing catalyst (such as ferric acetylacetonate) along with addition of the diisocyanate. Modifications of the above methods of introducing the additives such as, for example, addition of the wetting agents to the diol prior to introduction into the mixer, are varied and many. Likewise, there are many techniques for processing the major components in the preparation of our novel propellants. For example, the diol can first be mixed with the aluminum, silicon, or graphite and then with the inorganic oxidizer, after which the diisocyanate can be added, along with the catalyst and cross-linker.

After the propellant batch has been mixed to substantial uniformity, it is cast, extruded, or compression-formed to the desired shape and cured at a temperature preferably within the range from about 70° to about 180° F. As pointed out above, the propellant mixture can be cast directly into a rocket chamber lined with an inert liner material, and polymerized (cured) therein if this procedure appears to be desirable.

Very small amounts, in the order of about 1 or 2 percent by weight (total propellant weight basis), or even less, of our resonance suppressing agents are employed for purposes of this invention. It is within the scope of the invention, however, to employ quantities up to that equivalent to about 4 percent by weight of the propellant. There is no practical reason to employ quantities of our resonance suppressing agents greater than as set forth above since no additional resonance suppressing advantages are gained thereby. The propellant binder is preferably employed in a proportion within the range from about 5 to about 55 percent and the nonmetallic oxidizing salt in an amount within the range from about 95 to about 45 percent by weight. The term binder, when used herein to denote a polyurethane binder, includes not only the diol (or equivalent) and diisocyanate (or equivalent) reaction product but any cross-linker present as well.

The preferred proportions of binders and oxidizing salts set forth above are particularly applicable where propellants incorporating polyurethane binders are concerned. However, as pointed out above, our invention is not limited to polyurethane propellant systems and it constitutes an improvement in solid propellants in general. In this connection, it should be emphasized that propellants having high energy binders such as nitro-containing polyurethanes or the like, in which little or no oxidizing salt need be present, as well as oxygen deficient propellants contemplated for use in hybrid rocket systems, in which needed oxygen is supplied in the form of a liquid oxidizer, when improved by the addition of relatively small amounts of aluminum, as taught herein, are within the scope of our invention. In view of the wide variety of binder systems within the scope of our invention, it is clear that the above-stated ranges of binder and oxidizer proportions are not applicable to all of our novel propellant formulations. This is particularly evident in view of the above-mentioned fact that some of our improved propellants contain no oxidizing salt at all. It is not felt necessary to enumerate preferred proportions of ingredients other than the resonance suppressing agents for every type of propellant within the scope of our invention since such proportions are not critical to the invention and, furthermore, information of that type is either available in the material incorporated by reference into this specification, known to those skilled in the art or readily ascertainable to those skilled in the art by means of routine experimentation.

The proportions of the ingredients which go to make up the fuel or binder component of this invention can vary through wide ranges, depending on the properties desired in the propellant and the specific reactants employed. Although stoichiometric proportions of hydroxy and isocyanate components can be employed in the preparation of our preferred polyurethane propellants, we have found that a product of improved mechanical properties is obtained if a slight excess of isocyanate groups over hydroxy groups is present in the fuel mixture. Consequently, for best results we have found that there should be from about 100 to about 115 equivalents of isocyanate or isothiocyanate containing monomer in the fuel mixture for every 100 equivalents of hydroxy or thiol containing monomer therein.

There can, of course, be more than one isocyanate compound or equivalent, as well as more than one hydroxy compound or equivalent, in the polyurethane mixture, in which case the calculation of excess isocyanate over hydroxy groups is based upon the total amounts of all pertinent compounds present. For example, where the cross-linker is a polyhydroxy compound the excess of isocyanate compound (or equivalent) is calculated as an excess over the amount of diol (or its equivalent) plus the amount of cross-linker. The relative proportions of diol and cross-linker can vary through wide ranges so long as a cross-linked structure is obtained in the fuel.

The various additives and minor components of our preferred polyurethane propellants (those ingredients other than the urethane and cross-linker reactants) normally comprise a very small percentage of the total propellant weight. Thus, they will usually be present in combined amount not greater than that corresponding to about 10 percent (and preferably about 4 or 5 percent) of the total propellant weight.

The following examples are included for purposes of illustrating the novel process and propellant compositions of our invention. Applicants wish to empasize that these examples are intended for illustrative purposes only and that they should not be construed as limitative of the scope of the invention to the particular conditions and embodiments set forth therein.

EXAMPLE I

This example describes a particular method of preparing a novel propellant composition according to this invention from the following ingredients:

| Ingredient: | Weight percent |
| --- | --- |
| Ammonium perchlorate | 81.00 |
| Aluminum | 0.50 |
| Copper chromite (CuO2O2) | 0.40 |
| Phenyl betanaphthylamine | 0.20 |
| Ferric acetylacetonate | 0.05 |
| Polypropylene glycol 2025 [1] | 11.00 |
| Glycerol monoricinoleate | 1.35 |
| Dioctyl azelate | 3.55 |
| Lecithin | 0.10 |
| Tolylene diisocyanate | 1.85 |
|  | 100.00 |

[1] Manufacturer's designation indicating the value of the molecular weight.

The ammonium perchlorate oxidizer is stored at 110° F. in a closed vinyl bag, for 48 hours, prior to the propellant mixing operation.

The aluminum powder is stirred into about ⅓ of the required volume of polypropylene glycol and glycerol monoricinoleate. The mixture is prepared in a stainless steel container, using a copper-beryllium spatula. Mixing is continued for about ten minutes.

The aluminum slurry is added to a conventional mixer equipped with facilities for heating, cooling, and vacuumizing the propellant mix. The walls of the aluminum slurry container are scraped thoroughly. The container is rinsed with the dioctyl azelate and the rinses are added to the mixture. The remaining polypropylene glycol is added to the mixer.

With the mixer off, the ferric acetylacetonate, phenyl betanaphthylamine, and lecithin are added through a 40-mesh screen. The copper chromite is added to the mixer.

The mixer is covered and mixed by remote control for 15 minutes under 26–28 inches of vacuum, after which it is stopped and the vacuum released with dry nitrogen. The cover is removed from the mixer and the oxidizer is added by remote control with the mixer blades in motion.

After all of the oxidizer has been added, the mixer is stopped and scraped down. The propellant mass is mixed for 15 minutes at 70° F. under 26 inches vacuum by remote control. The mixer is stopped and the vacuum released with dry nitrogen. The tolylene diisocyanate is added, after which the mass is mixed for ten minutes at 70° F. and 26 inches of vacuum by remote control. The vacuum is then released with dry nitrogen and the mixture is cast.

Following are other propellant formulations from which propellant grains are prepared according to methods similar to that described in Example I.

EXAMPLE II

| Ingredient: | Weight percent |
| --- | --- |
| Ammonium perchlorate | 81.00 |
| Aluminum | 1.00 |
| Copper chromite (CuO2O2) | 0.40 |
| Phenyl betanaphthylamine | 0.20 |
| Ferric acetylacetonate | 0.05 |
| Polypropylene glycol 2025 | 10.70 |
| Glycerol monoricinoleate | 1.31 |
| Dioctyl azelate | 3.45 |
| Lecithin | 0.10 |
| Tolylene diisocyanate | 1.79 |
|  | 100.00 |

EXAMPLE III

| Ingredient: | Weight percent |
| --- | --- |
| Ammonium perchlorate | 81.00 |
| Aluminum | 2.00 |
| Copper chromite (CuO2O2) | 0.40 |
| Carbon black (Thermax) | 0.50 |
| Phenyl betanaphthylamine | 0.20 |
| Ferric acetylacetonate | 0.06 |
| Polypropylene glycol 2025 | 9.71 |
| Glycerol monoricinoleate | 1.19 |
| Dioctyl azelate | 3.15 |
| Lecithin | 0.16 |
| Tolylene diisocyanate | 1.63 |
|  | 100.00 |

EXAMPLE IV

| Ingredient: | Weight percent |
| --- | --- |
| Ammonium perchlorate | 81.50 |
| Aluminum (Alcoa 120) | 2.00 |
| Ferric acetylacetonate | 0.07 |
| Carbon black (Thermax) | 0.10 |
| Phenyl betanaphthylamine | 0.20 |
| Glycerol monoricinoleate | 0.82 |
| Tolylene diisocyanate | 1.50 |
| Dioctyl azelate | 3.18 |
| Lecithin | 0.12 |
| Polypropylene glycol 2025 | 10.43 |
| G-2684 [1] | 0.08 |
|  | 100.00 |

[1] A mixture of sorbitan, monoricinoleate, and polyoxyethylene esters of mixed fatty and resin acids.

EXAMPLE V

| Ingredient: | Weight percent |
| --- | --- |
| Ammonium perchlorate | 82.00 |
| Aluminum (Alcoa 101) | 1.00 |
| Copper chromite (CuO2O2) | 1.00 |
| Phenyl betanaphthylamine | 0.20 |
| Lecithin | 0.15 |
| Ferric acetylacetonate | 0.06 |
| Polypropylene glycol 2025 | 10.20 |
| Glycerol monoricinoleate | 0.80 |
| Dioctyl azelate | 3.12 |
| Tolylene diisocyanate | 1.47 |
|  | 100.00 |

EXAMPLE VI

| Ingredient: | Weight percent |
|---|---|
| Ammonium perchlorate | 82.00 |
| Graphite | 1.00 |
| Copper chromite (CuO2O2) | 1.00 |
| Phenyl betanaphthylamine | 0.20 |
| Lecithin | 0.15 |
| Ferric acetylacetonate | 0.06 |
| Polypropylene glycol 2025 | 10.20 |
| Glycerol monoricinoleate | 0.80 |
| Dioctyl azelate | 3.12 |
| Tolylene diisocyanate | 1.47 |
| | 100.00 |

EXAMPLE VII

| Ingredient: | Weight percent |
|---|---|
| Ammonium perchlorate | 81.50 |
| Copper chromite (CuO2O2) | 0.50 |
| Silicon [1] | 2.00 |
| Ferric acetylacetonate | 0.07 |
| Glycerol monoricinoleate | 0.82 |
| Tolylene diisocyanate | 1.50 |
| Dioctyl azelate | 3.18 |
| Polypropylene glycol 2025 | 10.43 |
| | 100.00 |

[1] 170 mesh > 98 percent; 230 mesh > 90 percent

EXAMPLE VIII

| Ingredient: | Weight percent |
|---|---|
| Ammonium nitrate | 81.50 |
| Copper chromite (CuO2O2) | 0.50 |
| Silicon | 1.00 |
| Aluminum | 1.00 |
| Ferric acetylacetonate | 0.07 |
| Glycerol monoricinoleate | 0.82 |
| Tolylene diisocyanate | 1.50 |
| Dioctyl azelate | 3.18 |
| Polypropylene glycol 2025 | 10.43 |
| | 100.00 |

EXAMPLE IX

| Ingredient: | Weight percent |
|---|---|
| Ammonium perchlorate | 81.00 |
| Copper chromite (CuO2O2) | 0.50 |
| Aluminum | 0.50 |
| Silicon | 0.50 |
| Graphite | 0.50 |
| Stannic chloride | 0.07 |
| Glycerol monoricinoleate | 0.82 |
| Tolylene diisocyanate | 1.50 |
| Dioctyl azelate | 3.18 |
| Polypropylene glycol 2025 | 10.43 |
| | 100.00 |

EXAMPLE X

This example describes motor firing tests in which propellant grains with and without a resonance suppressor were fired in a test motor to obtain data from which pressure-time curves were plotted. Pressure-time curves are useful in indicating whether or not, or to what degree, particular propellants are subject to resonant burning.

A 60-pound batch of propellant was mixed, cast, and cured to form an internal-external burning tubular propellant grain. The grain contained no resonance suppressor material and was to be used as the control for a series of motor firing tests. Its formulation was as follows:

| Ingredient: | Weight percent |
|---|---|
| $NH_4ClO_4$ | 81.50 |
| Copper chromite (CuO2O2) | 0.50 |
| Polyurethane fuel | 18.00 |
| | 100.00 |

The polyurethane fuel was comprised of polypropylene glycol 2025, glycerol monoricinoleate, dioctyl azelate, and tolylene diisocyanate in the following equivalent proportions, respectively, 60/40/20/107.

Three other grains identical to the above in formulation except for the inclusion of small amounts of aluminum as a resonance suppressor were prepared. The three grains each contained 81.50 percent $NH_4ClO_4$ and 0.50 percent copper chromite and polyurethane fuel of the same ingredients and ingredient equivalents of the control grain. The following table gives the weight percent of aluminum and of polyurethane fuel in each of the three grains as well as the type of aluminum used in each.

| Weight Percent of Aluminum | Weight Percent of Polyurethane | Type of Aluminum |
|---|---|---|
| 0.2 | 17.80 | Reynolds 400 |
| 0.5 | 17.50 | Alcoa 101. |
| 1.0 | 17.00 | Alcoa 120 |

The four propellant grains described above were conditioned to a temperature of 60° F. and then each was subjected to a static firing test under identical conditions. During the test, pressures within the combustion chamber were recorded. FIGURES 1, 2, 3, and 4 of the accompanying drawings depict the pressure-time curves derived from the firing tests.

Figure 1:
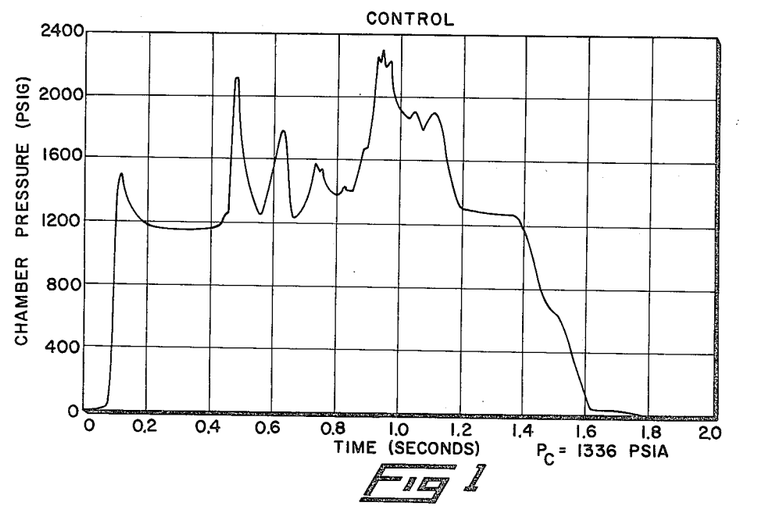
Figure 2:
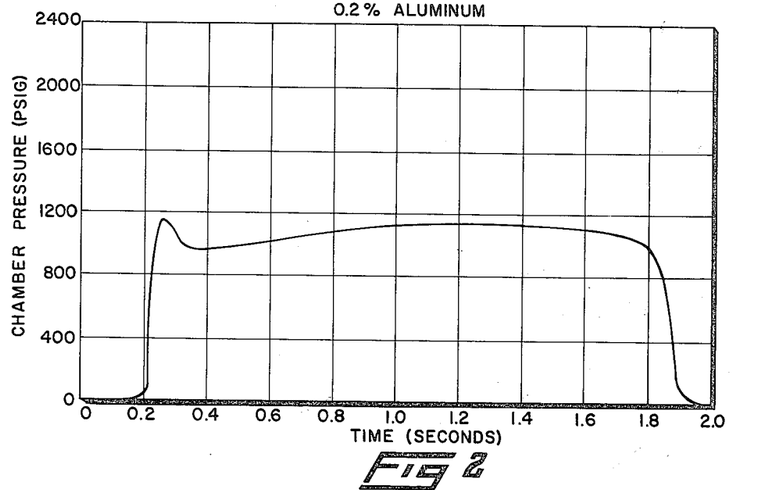
Figure 3:
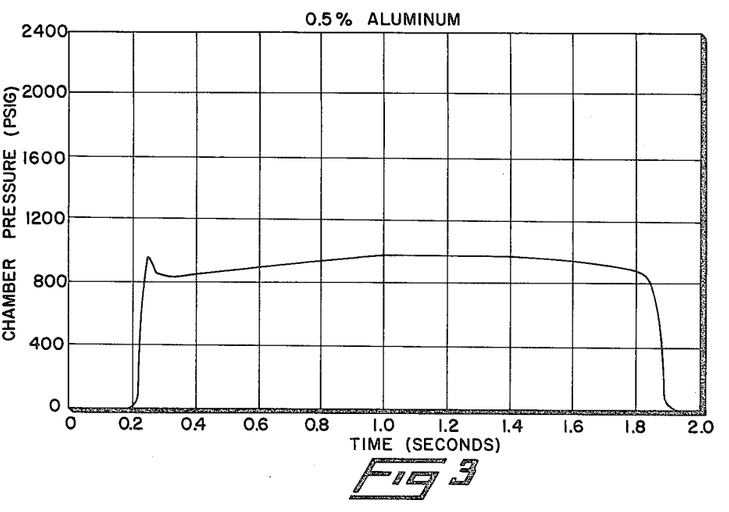
Figure 4:
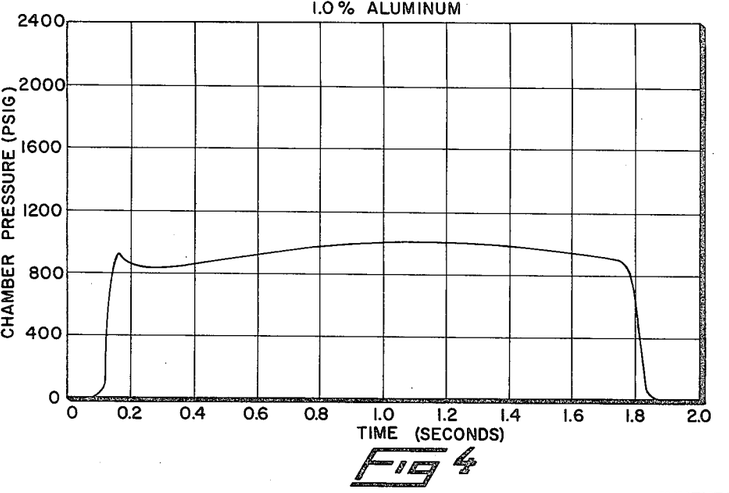

Turning first to FIGURE 1, it will be noted that the pressure-time curve shown there is jagged, with many pressure peaks evident. FIGURE 1 is the pressure-time curve of the control test and it is quite obvious from its many sharp pressure peaks of substantial magnitude that the propellant exhibited a high degree of resonance during burning. Contrasted with the rough and jagged nature of the FIGURE 1 curve are the smooth curves of FIGURES 2, 3, and 4 which depict the chamber pressure conditions during firing of the three aluminum-containing propellants. A comparison of any of the latter three curves with that of FIGURE 1 graphically illustrates the effectiveness of small quantities of aluminum in eliminating the problem of resonant burning which has heretofore plagued the solid propellant industry.

Propellant grains similar to those tested, only containing silicon and graphite rather than aluminum as resonance suppressors, were made up and subjected to motor firing tests. Here again, as in the case of the aluminum-containing grains, the pressure-time curves were smooth, indicating an absence of resonant burning during the firing tests.

We claim:
1. A substantially homogeneous solid propellant composition consisting essentially of from about 95 percent to about 45 percent by weight of a cured intimate mixture of a solid nonmetallic oxidizing salt selected from the group consisting of oxidizing salts of ammonia, guanidine, hydrazine, and mixtures thereof and from about 5 percent to about 55 percent by weight of a cross-linked resin binder which comprises the reaction product of a compound having, as its sole reacting groups, not less than two active hydrogen groups capable of polymerizing with an isocyanate and a compound having, as its sole reacting groups, not less than two groups capable of undergoing a urethane-type reaction with hydroxy groups and, as a resonance suppressor, a material which is uniformly dispersed throughout said propellant composition and being selected from the group consisting of aluminum, silicon, graphite, and mixtures thereof, the resonance suppressor material being present in an amount not greater than that equivalent to about 4 percent by weight of the propellant composition.

2. A substantially homogeneous solid propellant composition consisting essentially of from about 95 percent to about 45 percent by weight of a cured intimate mixture of a solid nonmetallic oxidizing salt selected from the group consisting of oxidizing salts of ammonia, guanidine, hydrazine, and mixtures thereof and from about 5 percent to about 55 percent by weight of a cross-linked resin binder which comprises the reaction product of a compound having, as its sole reacting groups, not less than two active hydrogen groups capable of polymerizing with an isocyanate and a stoichiometric excess of a compound having, as its sole reacting groups, not less than two groups capable of undergoing a urethane-type reaction with hydroxy groups; the stoichiometric excess being calculated as an excess over all active hydrogen groups capable of polymerizing with an isocyanate initially present and, as a resonance suppressor, a material which is uniformly dispersed throughout said propellant composition and being selected from the group consisting of aluminum, silicon, graphite, and mixtures thereof, the resonance suppressor material being present in an amount not greater than that equivalent to about 4 percent by weight of the propellant composition.

3. The substantially homogeneous solid propellant composition of claim 2 wherein the stoichiometric excess of reactant material containing groups capable of undergoing a urethane-type reaction with hydroxy groups over the reactant material containing active hydrogen groups capable of polymerizing with an isocyanate corresponds to a proportion of from about 100 to about 115 equivalents of the former for every 100 equivalents of the latter.

4. A substantially homogeneous solid propellant composition consisting essentially of from about 95 percent to about 45 percent by weight of a cured intimate mixture of a solid nonmetallic oxidizing salt selected from the group consisting of oxidizing salts of ammonia, guanidine, hydrazine, and mixtures thereof and from about 5 percent to about 55 percent by weight of a resin binder which comprises the reaction product of a compound having two active hydrogen groups capable of polymerizing with an isocyanate selected from the group consisting of:

(a) alkane diols having a chain length of from 2 to 20 carbon atoms, inclusive;
(b) alkane dithiols having a chain length of from 2 to 20 carbon atoms;
(c) alkene diols;
(d) alkene dithiols;
(e) cycloalkylene diols;
(f) cycloalkylene dithiols;
(g) aromatic diols;
(h) aromatic dithiols;
(i) alkane ether diols;
(j) alkane ether dithiols;
(k) diamido alkane diols;
(l) diamido alkane dithiols;
(m) dihydroxy polyesters having a molecular weight from about 1000 to about 2500;
(n) polyalkylene ether glycols having a molecular weight from about 400 to about 10,000;
(o) polysulfides with glycol end groups;
and mixtures thereof;

a compound selected from the group consisting of:

(1) alkane diisocyanates;
(2) alkane diisothiocyanates;
(3) alkene diisocyanates;
(4) alkene diisothiocyanates;
(5) alkylidene diisocyanates;
(6) alkylidene diisothiocyanates;
(7) cycloalkylene diisocyanates;
(8) cycloalkylene diisothiocyanates;
(9) cycloalkylidene diisocyanates;
(10) cycloalkylidene diisothiocyanates;
(11) aromatic diisocyanates;
(12) aromatic diisothiocyanates;
(13) alkane ether diisocyanates;
(14) alkane ether diisothiocyanates;
and mixtures thereof;

and, as a cross-linking agent, a compound having as its sole reacting groups, not less than three groups polymerizable with a radical selected from the group consisting of hydroxy, thiol, isocyanate, and isothiocyanate groups; and, as a resonance suppressor, a material which is uniformly dispersed throughout said propellant composition and being selected from the group consisting of finely divided aluminum, finely divided silicon, finely divided graphite, and mixtures thereof, the resonance suppressor material being present in an amount not greater than that equivalent to about 4 percent by weight of the propellant composition.

5. The substantially homogeneous solid propellant composition of claim 4 wherein the resin binder comprises the reaction product of a stoichiometric excess of the compound selected from the group consisting of:

(1) alkane diisocyanates;
(2) alkane diisothiocyanates;
(3) alkene diisocyanates;
(4) alkene diisothiocyanates;
(5) alkylidene diisocyanates;
(6) alkylidene diisothiocyanates;
(7) cycloalkylene diisocyanates;
(8) cycloalkylene diisothiocyanates;
(9) cycloalkylidene diisocyanates;
(10) cycloalkylidene diisothiocyanates;
(11) aromatic diisocyanates;
(12) aromatic diisothiocyanates;
(13) alkane ether diisocyanates;
(14) alkane ether diisothiocyanates;
and mixtures thereof;

the stoichiometric excess being calculated as an excess over the combined equivalents of the compound having two hydrogen groups capable of polymerizing with an isocyanate and the cross-linking agent.

6. The substantially homogeneous solid propellant composition of claim 4 wherein the resin binder comprises the reaction product of from about 100 to about 115 equivalents of the compound selected from the group consisting of:

(1) alkane diisocyanates;
(2) alkane diisothiocyanates;
(3) alkene diisocyanates;
(4) alkene diisothiocyanates;
(5) alkylidene diisocyanates;
(6) alkylidene diisothiocyanates;
(7) cycloalkylene diisocyanates;
(8) cycloalkylene diisothiocyanates;
(9) cycloalkylidene diisocyanates;
(10) cycloalkylidene diisothiocyanates;
(11) aromatic diisocyanates;
(12) aromatic diisothiocyanates;
(13) alkane ether diisocyanates;
(14) alkane ether diisocyanates;
and mixtures thereof;

for every 100 equivalents of the compound having two active hydrogen groups capable of polymerizing with an isocyanate plus the cross-linking agent.

7. A substantially homogeneous solid propellant composition which comprises a cured intimate mixture of finely divided aluminum, a solid nonmetallic oxidizing salt selected from the group consisting of oxidizing salts of ammonia, guanidine, hydrazine, and mixtures thereof, and a resin binder which comprises the reaction product of an aromatic diisocyanate, a polyether having a molecular weight between about 400 and 10,000, and a trihydroxy cross-linker compound; the aluminum being present in an amount not greater than about 4 percent by weight, the resin binder being present in an amount between about 5 and about 55 percent by weight, and the solid nonmetallic oxidizing salt being present in an amount between about 95 and about 45 percent by weight, all percentages being given on a total propellant weight basis, said finely divided aluminum being uniformly dispersed throughout said propellant composition.

8. The substantially homogeneous solid propellant composition of claim 7 wherein the aromatic diisocyanate is present in stoichiometric excess, the stoichiometric excess having been calculated as an excess over the combined amounts of polyether and trihydroxy compound initially present.

9. A substantially homogeneous solid propellant composition which comprises a cured intimate mixture of finely divided aluminum, a solid nonmetallic oxidizing salt selected from the group consisting of oxidizing salts of ammonia, guanidine, hydrazine, and mixtures thereof, and a resin binder which comprises the reaction product of an aromatic diisocyanate, a polyether having a molecular weight between about 400 and about 10,000, and, as a cross-linker, glycerol monoricinoleate; the aluminum being present in an amount not greater than about 4 percent by weight, the resin binder being present in an amount between about 5 and about 55 percent by weight, the nonmetallic oxidizing salt being present in an amount between 95 and about 45 percent by weight, all percentages being given on a total propellant weight basis, and the aromatic diisocyanate being present in stoichiometric excess, the stoichiometric excess having been calculated as an excess over the combined amounts of polyether and glycerol monoricinoleate initially present, said finely divided aluminum being uniformly dispersed throughout said propellant composition.

10. A substantially homogeneous solid propellant composition which comprises a cured intimate mixture of finely divided aluminum, a solid nonmetallic oxidizing salt selected from the group consisting of oxidizing salts of ammonia, guanidine, hydrazine, and mixtures thereof, and a resin binder which comprises the reaction product of 2,4-tolylene diisocyanate, polypropylene glycol having a molecular weight of from about 2,000 to about 3,000, and glycerol monoricinoleate; the aluminum being present in an amount not greater than about 4 percent by weight, the resin binder being present in an amount between about 5 and about 55 percent by weight, and the solid nonmetallic oxidizing salt being present in an amount between about 95 and about 45 percent by weight, all percentages being given on a total propellant weight basis, said finely divided aluminum being uniformly dispersed throughout said propellant composition.

11. A substantially homogeneous solid propellant composition which comprises a cured intimate mixture of finely divided aluminum, a solid nonmetallic oxidizing salt selected from the group consisting of oxidizing salts of ammonia, guanidine, hydrazine, and mixtures thereof, a resin binder which comprises the reaction product of 2,4-tolylene diisocyanate, polypropylene glycol having a molecular weight of from about 2,000 to about 3,000, and glycerol monoricinoleate; the aluminum being present in an amount not greater than about 4 percent by weight, the resin binder being present in an amount between about 5 and about 55 percent by weight, the nonmetallic oxidizing salt being present in an amount between about 95 and about 45 percent by weight, all percentages being given on a total propellant weight basis, and the 2,4-tolylene diisocyanate being present in stoichiometric excess, the stoichiometric excess having been calculated as an excess over the amounts of polypropylene glycol and glycerol monoricinoeate initially present, said finely divided aluminum being uniformly dispersed throughout said propellant composition.

12. The substantially homogeneous solid propellant composition of claim 11 wherein the aluminum is present in an amount not greater than that equivalent to about 2 percent by weight of the propellant composition.

13. The substantially homogeneous solid propellant composition of claim 10 wherein the nonmetallic oxidizing salt is ammonium perchlorate.

14. The method of preparing a substantially homogeneous solid propellant composition which comprises intimately and uniformly dispersing from about 95 percent to about 45 percent by weight of a solid nonmetallic oxidizing salt selected from the group consisting of oxidizing salts of ammonia, guanidine, hydrazine, and mixtures thereof and, as a resonance suppressor, a material selected from the group consisting of finely divided aluminum, finely divided silicon, finely divided graphite, and mixtures thereof, in from about 5 percent to about 55 percent by weight of a binder mixture comprising a compound having two active hydrogen groups capable of reacting with an isocyanate selected from the group consisting of:

(a) alkane diols having a chain length of from 2 to 20 carbon atoms, inclusive;
(b) alkane dithiols having a chain length of from 2 to 20 carbon atoms;
(c) alkene diols;
(d) alkene dithiols;
(e) cycloalkylene diols;
(f) cycloalkylene dithiols;
(g) aromatic diols;
(h) aromatic dithiols;
(i) alkane ether diols;
(j) alkane ether dithiols;
(k) diamido alkane diols;
(l) diamido alkane dithiols;
(m) dihydroxy polyesters having a molecular weight from about 1000 to about 2500;
(n) polyalkylene ether glycols having a molecular weight from about 400 to about 10,000;
(o) polysulfides with glycol end groups;
and mixtures thereof;

a compound selected from the group consisting of:
(1) alkane diisocyanates;
(2) alkane diisothiocyanates;
(3) alkene diisocyanates;
(4) alkene diisothiocyanates;
(5) alkylidene diisocyanates;
(6) alkylidene diisothiocyanates;
(7) cycloalkylene diisocyanates;
(8) cycloalkylene diisothiocyanates;
(9) cycloalkylidene diisocyanates;
(10) cycloalkylidene diisothiocyanates;
(11) aromatic diisocyanates;
(12) aromatic diisothiocyanates;
(13) alkane ether diisocyanates;
(14) alkane ether diisothiocyanates;
and mixtures thereof;

and, as a cross-linking agent, a compound having not less than 3 groups polymerizable with a group selected from the class consisting of hydroxy, thiol, isocyanate, and isothiocyanate groups; and curing the mixture; the resonant suppressor material being added in an amount not greater than that equivalent to about 4 percent by weight of the propellant composition.

15. The method of claim 14 wherein the resonance suppressor material is finely divided aluminum.

16. The method of claim 14 wherein the mixture is cured within the temperature range from about 60° to about 200° F.

17. The method of claim 14 wherein the aluminum is mixed with the binder ingredients of the system prior to incorporating the oxidizing salt therein.

18. A substantially homogeneous solid propellant composition consisting essentially of a cured intimate mixture of a solid nonmetallic oxidizing salt selected from the group consisting of oxidizing salts of ammonia, guanidine, hydrazine, and mixtures thereof, a rubber binder, and, as a resonance suppressor, a material which is uniformly dispersed throughout said propellant composition and being selected from the group consisting of aluminum, silicon, graphite, and mixtures thereof, in an amount not greater than that corresponding to about 4 percent by weight of the total propellant composition.

19. A substantially homogeneous solid propellant composition consisting essentially of a cured intimate mixture of a solid nonmetallic oxidizing salt selected from the group consisting of oxidizing salts of ammonia, guanidine, hydrazine, and mixtures thereof, a polyester resin binder, and, as a resonance suppressor, a material which is uniformly dispersed throughout said propellant composition and being selected from the group consisting of aluminum, silicon, graphite, and mixtures thereof, in an amount not greater than that corresponding to about 4 percent by weight of the total propellant composition.

20. A substantially homogeneous solid propellant composition consisting essentially of a cured intimate mixture of a solid nonmetallic oxidizing salt selected from the group consisting of oxidizing salts of ammonia, guanidine, hydrazine, and mixtures thereof, an acrylate resin binder, and as a resonance suppressor, a material which is uniformly dispersed throughout said propellant composition and being selected from the group consisting of aluminum, silicon, graphite, and mixtures thereof, in an amount not greater than that corresponding to about 4 percent by weight of the total propellant composition.

21. A substantially homogeneous solid propellant composition consisting essentially of a cured intimate mixture of a solid nonmetallic oxidizing salt selected from the group consisting of oxidizing salts of ammonia, guanidine, hydrazine, and mixtures thereof, a polysulfide binder, and, as a resonance suppressor, a material which is uniformly dispersed throughout said propellant composition and being selected from the group consisting of aluminum, silicon, graphite, and mixtures thereof, in an amount not greater than that corresponding to about 4 percent by weight of the total propellant composition.

22. A substantially homogeneous solid propellant composition consisting essentially of a cured intimate mixture of a solid nonmetallic oxidizing salt selected from the group consisting of oxidizing salts of ammonia, guanidine, hydrazine, and mixtures thereof, a nitrocellulose plasticizer binder, and, as a resonance suppressor, a material which is uniformly dispersed throughout said propellant composition and being selected from the group consisting of aluminum, silicon, graphite, and mixtures thereof, in an amount not greater than that corresponding to about 4 percent by weight of the total propellant composition.

23. A substantially homogeneous solid propellant composition consisting essentially of a cured intimate mixture of a nitropolyurethane binder and, as a resonance suppressor, a material which is uniformly dispersed throughout said propellant composition and being selected from the group consisting of aluminum, silicon, graphite, and mixtures thereof, in an amount not greater than that corresponding to about 4 percent by weight of the total propellant composition.

24. In the method of producing thrust for propulsion by combusting a substantially homogeneous solid propellant charge, the improvement which comprises burning said propellant in the presence of a material which is uniformly dispersed throughout said propellant charge and which acts as a resonance suppressor selected from the group consisting of aluminum, silicon, graphite, and mixtures thereof, said resonance suppressor material being present in an amount not greater than that corresponding to about 4 percent by weight of the total propellant composition.

25. A substantially homogeneous solid propellant composition consisting essentially of a cured intimate mixture of a solid non-metallic oxidizing salt selected from the group consisting of oxidizing salts of ammonia, guanidine, hydrazine, and mixtures thereof, a rubber binder, and, as a resonance suppressor, a material which is uniformly dispersed throughout said propellant composition and being selected from the group consisting of aluminum, silicon, graphite, and mixtures thereof, in an effective amount less than 2 percent by weight of the total propellant composition.

26. In the method of producing thrust for propulsion by combusting a solid substantially homogeneous propellant charge, the improvement which comprises burning said propellant in the presence of a material which is uniformly dispersed throughout said propellant charge and which acts as a resonance suppressor, selected from the group consisting of aluminum, silicon, graphite, and mixtures thereof, said resonance suppressor material being present in an effective amount less than 2 percent by weight of the total propellant composition.

27. A substantially homogeneous solid propellant composition consisting essentially of a cured intimate mixture of a solid non-metallic oxidizing salt selected from the group consisting of oxidizing salts of ammonia, guanidine, hydrazine and mixtures thereof, a rubber binder, and, as a resonance suppressor, graphite, which is uniformly dispersed throughout said propellant composition, in an effective amount less than 4 percent by weight of the total propellant composition.

28. In the method of producing thrust for propulsion by combusting a solid substantially homogeneous propellant charge, the improvement which comprises burning said propellant in the presence of graphite, which is uniformly dispersed throughout said propellant charge and which acts as a resonance suppressor, said resonance suppressor being present in an effective amount less than 4 percent by weight of the total propellant composition.

29. A substantially homogeneous solid propellant composition consisting essentially of a cured intimate mixture of a solid non-metallic oxidizing salt selected from the group consisting of oxidizing salts of ammonia, guanidine, hydrazine and mixtures thereof, a rubber binder, and, as a resonance suppressor, powdered silicon metal, which is uniformly dispersed throughout said propellant composition, in an effective amount less than 4 percent by weight of the total propellant composition.

30. In the method of producing thrust for propulsion by combusting a solid substantially homogeneous propellant charge, the improvement which comprises burning said propellant in the presence of powdered silicon metal, which is uniformly dispersed throughout said propellant charge and which acts as a resonance suppressor, said resonance suppressor being present in an effective amount less than 4 percent by weight of the total propellant composition.

References Cited in the file of this patent

UNITED STATES PATENTS

| | | |
|---|---|---|
| 2,597,641 | Hull | May 20, 1952 |
| 2,857,258 | Thomas | Oct. 21, 1958 |
| 2,941,010 | Mann et al. | June 14, 1960 |
| 2,970,898 | Fox | Feb. 7, 1961 |
| 2,988,876 | Walden | June 20, 1961 |
| 2,990,683 | Walden | July 4, 1961 |

OTHER REFERENCES

Zaehringer: "Missiles and Rockets," vol. 5, No. 7, Feb. 16, 1959, page 33.

Zaehringer: "Missiles and Rockets," vol. 5, No. 2, Jan. 12, 1959, pp. 16 and 17.

Zaehringer: "Missiles and Rockets," vol. 4, No. 6, Aug. 11, 1958, pp. 32 and 34.